(12) United States Patent
Tsuchiya et al.

(10) Patent No.: US 8,427,783 B2
(45) Date of Patent: Apr. 23, 2013

(54) HEAD-GIMBAL ASSEMBLY, MICROACTUATOR, AND MANUFACTURING METHOD OF THE MICROACTUATOR

(75) Inventors: Tatsumi Tsuchiya, Kanagawa (JP); Haruhide Takahashi, Kanagawa (JP); Akio Takatsuka, Kanagawa (JP); Hideto Imai, Kanagawa (JP); Toshiki Hirano, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 324 days.

(21) Appl. No.: 12/622,093

(22) Filed: Nov. 19, 2009

(65) Prior Publication Data

US 2011/0075301 A1    Mar. 31, 2011

(30) Foreign Application Priority Data

Nov. 19, 2008    (JP) ................................ 2008-296178

(51) Int. Cl.
  *G11B 5/60*    (2006.01)
(52) U.S. Cl.
  USPC ....................................... 360/234.5

(58) Field of Classification Search ........................ None
  See application file for complete search history.

(56) References Cited

U.S. PATENT DOCUMENTS

| | | | | |
|---|---|---|---|---|
| 5,956,208 | A * | 9/1999 | Kawazoe | 360/234.5 |
| 6,188,546 | B1 * | 2/2001 | Nakajima et al. | 360/234.5 |
| 6,351,353 | B1 * | 2/2002 | Sluzewski et al. | 360/294.3 |
| 6,833,978 | B2 * | 12/2004 | Shum et al. | 360/294.3 |
| 6,927,946 | B2 * | 8/2005 | Shum et al. | 360/294.3 |
| 7,623,321 | B2 * | 11/2009 | Li | 360/294.4 |
| 7,929,248 | B2 * | 4/2011 | Zhu et al. | 360/234.5 |
| 2005/0195529 | A1 * | 9/2005 | Tsuchida et al. | 360/234.5 |

FOREIGN PATENT DOCUMENTS

JP    2006244691    9/2006

* cited by examiner

*Primary Examiner* — David D Davis

(57) ABSTRACT

A head-gimbal assembly. The head-gimbal assembly includes a suspension, a microactuator disposed on the suspension, and a head-slider bonded to the microactuator. The head-gimbal assembly further includes a connection pad disposed on the suspension, a connection pad disposed on the microactuator and formed over an edge between a side surface and a top surface of the microactuator to have a bend portion with an obtuse angle, and a metallic interconnection joint for interconnecting the connection pad of the suspension with the connection pad of the microactuator.

4 Claims, 10 Drawing Sheets

US 8,427,783 B2

HEAD-GIMBAL ASSEMBLY, MICROACTUATOR, AND MANUFACTURING METHOD OF THE MICROACTUATOR

CROSS-REFERENCE TO RELATED APPLICATION

This application claims priority from the Japanese Patent Application No. 2008-296178, filed Nov. 19, 2008, the disclosure of which is incorporated herein in its entirety by reference.

TECHNICAL FIELD

Embodiments of the present invention relate to a head-gimbal assembly (HGA), a microactuator, and a manufacturing method of a microactuator.

BACKGROUND

Disk drives using various kinds of recording disks, such as optical disks, magneto-optical disks, and flexible magnetic-recording disks, are known in the art. In particular, hard-disk drives (HDDs) are widely used as indispensable data-storage devices for contemporary computer systems. Moreover, HDDs have found widespread application to motion picture recording and reproducing apparatuses, car navigation systems, cellular phones, and similar devices in addition to computers, due to their outstanding data-storage characteristics.

A magnetic-recording disk used in a HDD includes multiple concentric data tracks and servo tracks. Each data track includes a plurality of data sectors containing user data recorded thereon. Each servo track contains address information. A servo track includes a plurality of servo data regions arranged discretely in the circumferential direction, and one or more data sectors are recorded between servo data regions. A magnetic-recording head is configured to access a designated data sector in accordance with address information in the servo data to write data to, and read data from, the data sector.

The magnetic-recording head is formed on a slider; the slider is bonded to a suspension of an actuator. The assembly of the actuator and the head-slider is called a head-stack assembly (HSA), and the assembly of the suspension and the head-slider is called a head-gimbal assembly (HGA). Pressure produced by air viscosity between an air bearing surface (ABS) of the slider facing a magnetic-recording disk and a spinning magnetic-recording disk balances a force applied by the suspension toward the magnetic-recording disk, so that the head-slider flies in proximity to the recording surface of the magnetic-recording disk at a specific fly height. The actuator rotates on a pivot shaft to move the head-slider to a target track and position the head-slider on the track.

As the number of tracks per inch (TPI) on the magnetic-recording disk, which is one measure of data-storage capacity, increases, the positioning accuracy of the head-slider has correspondingly increased. However, there is a limit to the positioning accuracy of an actuator that is driven with a voice coil motor (VCM). Therefore, an approach is known in the art that mounts a compact actuator, which is referred to by the term of art, "microactuator," on a distal end of the actuator to achieve finer positioning. Therefore, engineers and scientists engaged in HDD manufacturing and development are interested in the design of HGAs, microactuators and methods of manufacturing the microactuator to meet the rising demands of the marketplace for increased data-storage capacity, performance, and reliability.

SUMMARY

Embodiments of the present invention include a head-gimbal assembly (HGA). The HGA includes a suspension, a microactuator disposed on the suspension, and a head-slider bonded to the microactuator. The HGA further includes a connection pad disposed on the suspension, a connection pad disposed on the microactuator and formed over an edge between a side surface and a top surface of the microactuator to have a bend portion with an obtuse angle, and a metallic interconnection joint for interconnecting the connection pad of the suspension with the connection pad of the microactuator.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
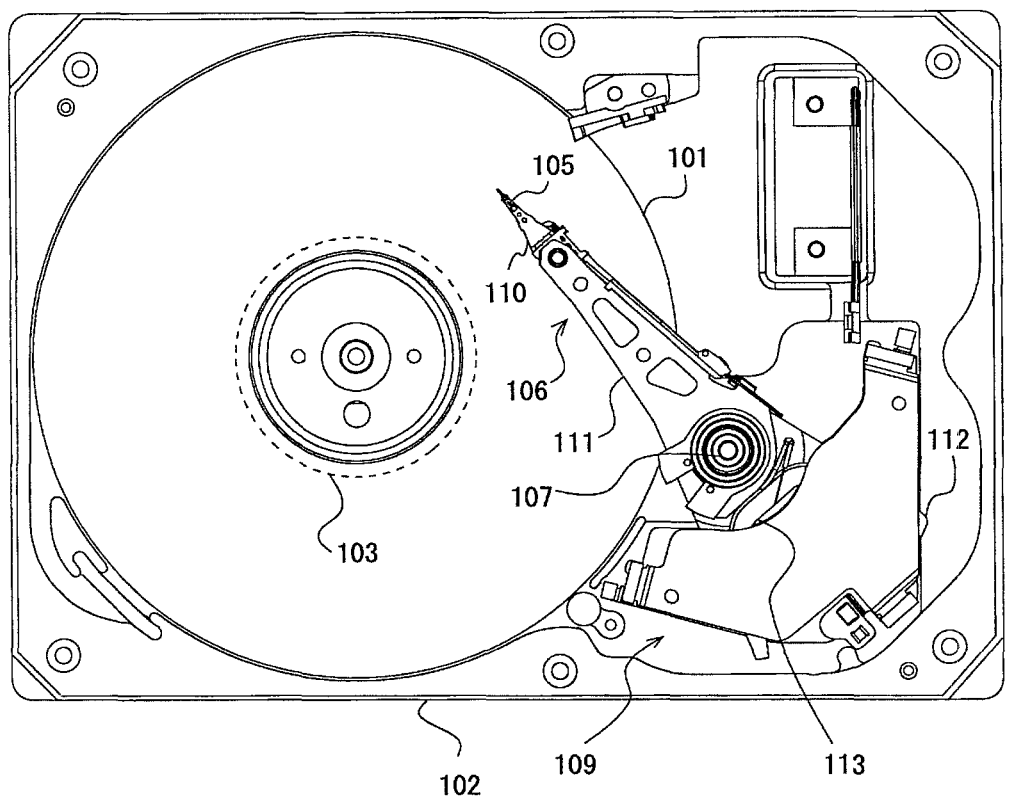
FIG. 1 is a plan view of a HDD with a cover of a disk enclosure (DE) removed, in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Description of Embodiments of the Present Invention for a Head-Gimbal Assembly, a Microactuator, and a Manufacturing Method of the Microactuator With relevance to embodiments of the present invention, among various microactuator structures known in the art, a structure in which a microactuator is mounted on a suspension and a head-slider is bonded to the microactuator provides more precise positioning, because the microactuator can directly and minutely move the head-slider. In particular, a microactuator including a micro-electromechanical system (MEMS) made of silicon for directly and minutely moving a head-slider provides increased capability in positioning of head-slider, because of a large displacement and a high resonant frequency.

To activate a microactuator, a signal is sent to the microactuator through transmission lines on a suspension. To this end, a connection pad on the suspension and a connection pad on the microactuator are interconnected. If a head-slider is on the microactuator so that the connection pad on the suspension and the connection pad on the head-slider cannot be directly interconnected, the head-slider is connected to a transmission line on the suspension through a connection pad disposed on the microactuator and a connection line.

Figure 10:
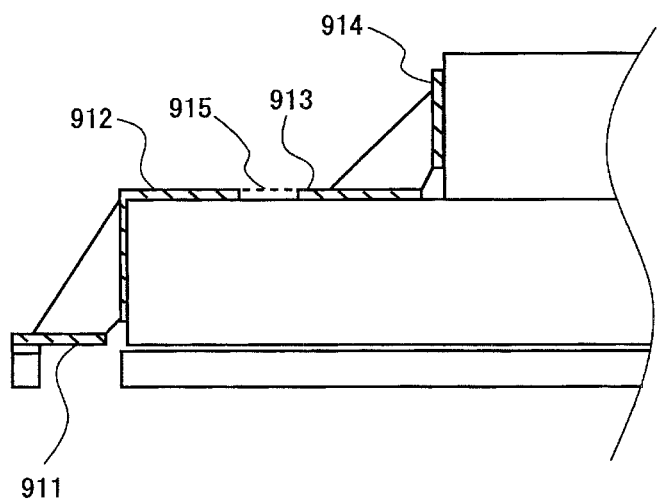
FIG. 10 is a drawing schematically illustrating a configuration of a metallic interconnection joint between a connection pad of a microactuator and a connection pad of a suspension, as is known in the art.

With reference now to FIG. 10, with relevance to embodiments of the present invention, a drawing is shown that schematically illustrates a metallic interconnection joint of an HGA including a microactuator having a MEMS, as is known in the art. A connection pad 911 of a suspension and a first connection pad 912 of a microactuator are interconnected by solder joining, or alternatively, gold joining. In addition, a second connection pad 913 of the microactuator and a connection pad 914 of the head-slider are interconnected by solder joining, or alternatively, gold joining. On the microactuator, the first connection pad 912 and the second connection pad 913 are connected by a transmission line 915.

As shown in FIG. 10, the first connection pad 912 of the microactuator is formed over the edge between a side surface and a top surface of the microactuator; a portion of the pad is formed on the side surface and the other portion is formed on the top surface. The side surface of the microactuator meets the top surface at a right angle; and, accordingly, the bend of the first connection pad 912 is also a right angle. The connection pads are made of metal, typically gold. The connection pads are formed by a physical vapor deposition (PVD) process such as sputtering or vacuum deposition, or by plating.

To increase the reliability of the connection pads, the connection pads are formed uniformly thick. However, if the confronting angle between the side portion and the top portion of the first connection pad 912 is a right angle as described above, forming a metal layer for the connection pad in a single process is likely to cause nonuniformity in thickness of the metal layer of the connection pad. If a semiconductor process is used in manufacturing the microactuator, the process is performed from above the top layer, so that depositing a metal layer for the side surface of the microactuator by plating is difficult. Then, the metal layer for the side portion of the first connection pad 912 is deposited by PVD. The deposited metal layer by PVD is thinner than that deposited by plating.

As described above, connection pads are connected with solder, or alternatively, gold. In accordance with embodiments of the present invention, the inventors have found, through their research, that if the metal layer of the side portion of the first connection pad, or alternatively, of a bend portion including a portion of the side portion, is thin, the first connection pad is more likely to break, because of stress at the metallic interconnection joint with the connection pad of a suspension. Accordingly, embodiments of the present invention provide a technique that increases the reliability at the metallic interconnection joint between a microactuator and a suspension.

In accordance with embodiments of the present invention, a head-gimbal assembly (HGA) includes a suspension, a microactuator disposed on the suspension, a head-slider bonded to the microactuator, a connection pad disposed on the suspension, a connection pad disposed on the microactuator and formed over the edge between a side surface and a top surface of the microactuator to have a bend portion at an obtuse angle, and a metallic interconnection joint for interconnecting the connection pad of the microactuator with the connection pad of the suspension. Thus, in accordance with embodiments of the present invention, reliability of the metallic interconnection joint between the microactuator and the suspension can be increased.

In one embodiment of the present invention, an angle between the connection pad of the suspension and the side portion of the connection pad of the microactuator is an obtuse angle of no more than 132°. In another embodiment of the present invention, the connection pad of the microactuator has a same thickness in the side portion and a top portion thereof. Thus, in accordance with embodiments of the present invention, the reliability of the metallic interconnection joint is increased.

In another embodiment of the present invention, the microactuator includes a silicon substrate having a movable portion and a stationary portion, and a piezoelectric element affixed on the silicon substrate; the angle of a bend portion formed by the side surface and the top surface is obtuse; and the connection pad of the microactuator is formed in conformity with a shape of the bend portion of the microactuator. Thus, in an embodiment of the present invention, a connection pad having the above-described structure can be formed easily and accurately in a microactuator capable of accurate positioning.

In another embodiment of the present invention, a microactuator is secured to a suspension, for moving a head-slider. The microactuator includes a silicon substrate including a movable portion and a stationary portion, a piezoelectric element affixed on the silicon substrate, a connection pad formed over the edge between a side surface and the top surface of a silicon substrate such that the angle between the side surface and the top surface of the silicon substrate is obtuse, and the connection pad of the microactuator is configured to interconnect with the connection pad of the suspension. Thus, in an embodiment of the present invention, the reliability of the metallic interconnection joint between the microactuator and the suspension can be increased utilizing a microactuator capable of accurate positioning.

Embodiments of the present invention also include a manufacturing method of a microactuator affixed on a suspension for moving a head-slider. The manufacturing method etches a silicon layer to form a slanted side surface at an obtuse angle relative to a top surface. The manufacturing method deposits a metal layer over an edge between the top surface and the slanted side surface to form a connection pad having an obtuse angle. The manufacturing method etches the silicon layer to form a movable portion in the silicon layer. The manufacturing method also affixes a piezoelectric element on the top surface of the silicon layer. Thus, in an embodiment of the present invention, a connection pad having the above-described structure can be formed easily and accurately.

In another embodiment of the present invention, the method further forms a seed layer on the top surface and the slanted side surface of the silicon layer, and deposits a metal layer on the seed layer by plating to form the connection pad for covering the edge between the top surface and the slanted side surface. Thus, in an embodiment of the present invention, a connection pad with high reliability can be formed. In another embodiment of the present invention, the method etches the silicon layer by anisotropic etching to form the slanted side surface. Thus, in an embodiment of the present invention, a connection pad with the above-described structure can be formed accurately.

Embodiments of the present invention provide enhanced reliability of the metallic interconnection joint between a microactuator and a suspension. Embodiments of the present invention are described for the environment of a hard-disk drive (HDD), as an example of a disk drive, by way of example without limitation thereto.

In accordance with embodiments of the present inventions, a HGA to be mounted in an HDD includes a microactuator in addition to a suspension and a head-slider. In one of the present invention, the microactuator includes a MEMS and a silicon substrate including a movable portion. In another embodiment of the present invention, a piezoelectric element is affixed to the silicon substrate and the movable portion of the silicon substrate moves with expansion and contraction of the piezoelectric element. In another embodiment of the present invention, a head-slider is bonded to the movable portion. In another embodiment of the present invention, the motion of the movable portion causes the head-slider to move with minuteness, which makes possible fine positioning of the head-slider.

In one embodiment of the present inventions, the microactuator further includes a connection pad to be interconnected with a connection pad of the suspension. In another embodiment of the present inventions, the connection pad is formed so as to cover the edge between the side surface and the top surface of the microactuator body; in other words, a portion of the connection pad is formed on the side surface of the microactuator body and the other portion is formed on the top surface thereof. In another embodiment of the present inventions, the angle between the side portion and the top portion of the connection pad is obtuse. Thus, in accordance with embodiments of the present invention, with this structure, a connection pad having a designated thickness can be formed easily; and, the reliability of the metallic interconnection joint between the microactuator and the suspension is increased.

With reference now to FIG. 1, in accordance with an embodiment of the present invention, a plan view of a HDD without a cover of a disk enclosure (DE) is shown. Mechanical components in the HDD 1 are housed in the base 102 of the DE; operation of the components in the base 102 of the DE is controlled by a control circuit (not shown) on a circuit board affixed outside the base 102 of the DE. HDD 1 includes a magnetic-recording disk 101, functioning as a disk for storage of data, a head-slider 105 for accessing the magnetic-recording disk 101, which includes both reading data from, and writing data to the magnetic-recording disk 101. The head-slider 105 includes a magnetic-recording head for reading user data from and/or writing user data to the magnetic-recording disk 101 and a slider on which the magnetic-recording head is formed.

An actuator 106 supports the head-slider 105. The actuator 106 rotates about a pivot shaft 107 to move the head-slider 105 in proximity with the recording surface of the spinning magnetic-recording disk 101 in order to access the magnetic-recording disk 101. A voice coil motor (VCM) 109 serves as a driving mechanism that drives the actuator 106. The assembly of the actuator 106 and the VCM 109 provides a moving mechanism for the head-slider 105. The actuator 106 includes components such as: a suspension 110, an arm 111, a coil support 112, and a VCM coil 113 connected in this order from the distal end, where the head-slider 105 is disposed, in the longitudinal direction.

A spindle motor (SPM) 103 affixed to the base 102 spins the magnetic-recording disk 101 at a specific angular rate. Pressure caused by air viscosity between an air bearing surface (ABS) of the slider facing the magnetic-recording disk 101 and the spinning magnetic-recording disk 101 balances the force applied by the suspension 110 in a direction toward the magnetic-recording disk 101, so that the head-slider 105 flies in proximity to the recording surface of the magnetic-recording disk 101.

Figure 2:
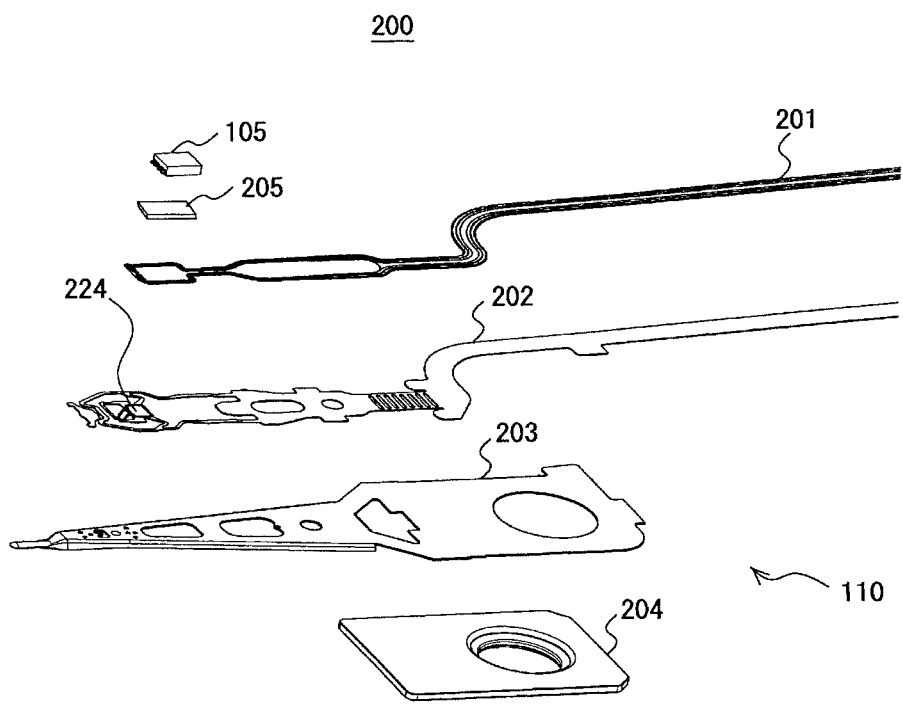
FIG. 2 is an exploded perspective view depicting components of a HGA, in accordance with an embodiment of the present invention.

With reference now to FIG. 2, in accordance with an embodiment of the present invention, an exploded perspective view is shown that depicts components of a HGA 200. HGA 200 includes a suspension 110, a microactuator 205, and a head-slider 105. The suspension 110 includes a flex cable 201, a gimbal 202, a load beam 203, and a mount plate 204. The load beam 203 is made of stainless steel, for example, in the form of a precision leaf spring. The stiffness of the load beam 203 is higher than that of the gimbal 202. The spring properties of the load beam 203 produce a load force on the head-slider 105, which balances the lift of the head-slider as described above.

The mount plate 204 and the gimbal 202 are made of stainless steel, for example. The gimbal 202 includes a gimbal tongue 224 on which the microactuator 205 and the head-slider 105 are bonded. The gimbal tongue 224, which is supported elastically, holds the microactuator 205 and the head-slider 105, and contributes to tilt control of the head-slider 105 by allowing tilting, freely.

Terminals on one end of the flex cable 201 including a plurality of transmission lines are connected to the microactuator 205 and the head-slider 105; and, terminals on the other end are connected to a substrate affixed to the actuator 106. The flex cable 201 carries a control signal for controlling the microactuator 205, as well as a read-back signal and a write signal. In accordance with embodiments of the present invention, the direction connecting the distal end of the actuator 106, which includes the suspension 110, and the pivot shaft 107 is referred to, herein, as the front-back direction, and the direction parallel to the main plane of the magnetic-recording disk 101, vertical to the front-back direction, and in the same direction as the pivot direction of the actuator 106 is referred to, herein, as the left-right direction.

Figure 3:
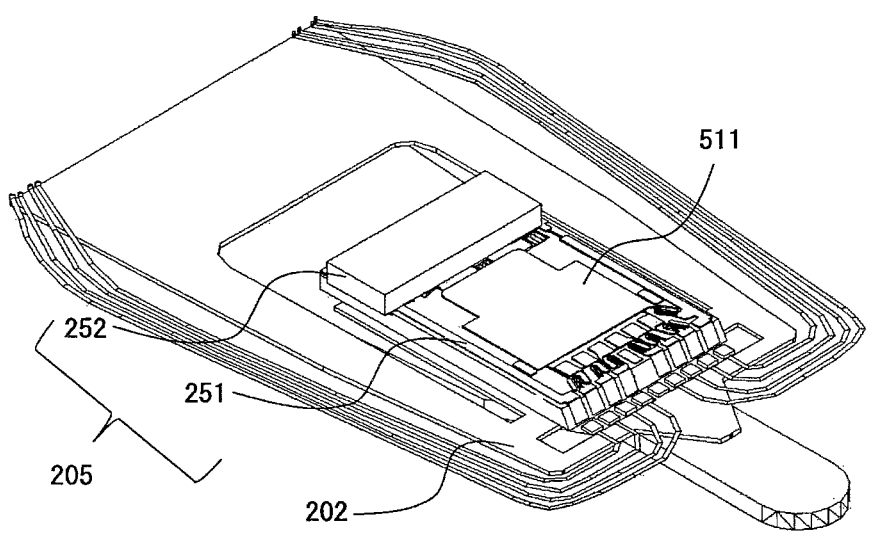
FIG. 3 is a perspective view schematically depicting a microactuator secured to a gimbal of a suspension of the HGA, in accordance with an embodiment of the present invention.

With reference now to FIG. 3, in accordance with an embodiment of the present invention, a perspective view is shown that schematically depicts a microactuator 205 which is secured to the gimbal 202 of the suspension 110. The microactuator 205 includes a MEMS 251 and a piezoelectric element 252. The MEMS 251 includes a silicon substrate including a movable portion and a metal layer formed on the silicon substrate. The metal layer includes a platform 511 on which a head-slider 105 may be mounted, connection pads, and transmission lines, and similar structures. In an embodiment of the present invention, the metal layer is made of gold. Under the metal layer that functions as a transmission line for the piezoelectric element 252 and the head-slider 105, an insulating layer, which may include a silicon oxide layer, or alternatively, a silicon nitride layer, by way of example without limitation thereto, is formed.

The piezoelectric element 252 is affixed to the surface of the MEMS 251 where the head-slider 105 is affixed. Although the head-slider 105 on the microactuator 205 in not shown in FIG. 3, in accordance with an embodiment of the present invention, the head-slider is bonded to the platform 511. In the present example, the piezoelectric element 252 is affixed to the disk-facing surface of the MEMS 251 at the leading-edge side, which is the pivot shaft 107 side, of the head-slider 105 (not shown in FIG. 3), which is bonded to the platform 511 shown in FIG. 3.

The silicon substrate of the MEMS 251 includes a movable portion and a stationary portion. The movable portion moves in response to expansion and contraction of the piezoelectric element 252. On the other hand, the stationary portion does not substantially move even if the piezoelectric element 252 expands and contracts. The silicon substrate is etched to form the movable portion. The platform 511 is affixed to a portion of the movable portion of the silicon substrate and turns in response to movement of the movable portion. The head-slider 105 on the platform 511 also turns with the turning of the platform 511, which leads to fine positioning of the magnetic-recording head on a target track, which is associated with a target position. The amount of turning is minute; and, the motion of the head-slider 105 caused by the motion of the microactuator 205 is slight compared with the motion of the actuator 106.

Figure 4:
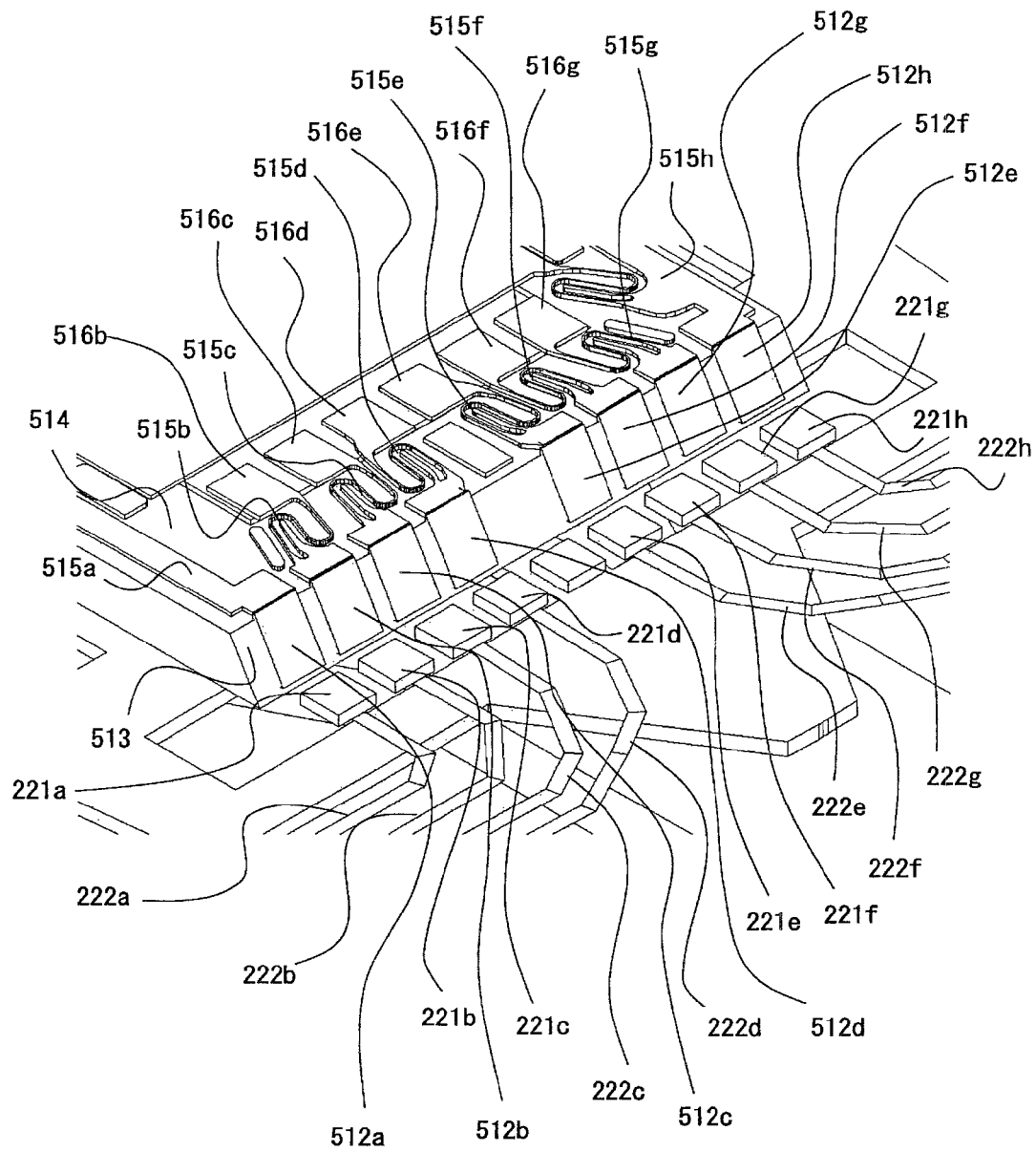
FIG. 4 is a perspective view depicting a structure of the proximity of the trailing edge of a micro-electromechanical system (MEMS), in accordance with an embodiment of the present invention.

With reference now to FIG. 4, in accordance with an embodiment of the present invention, a perspective view is shown that depicts the structure of the proximity of the trailing edge of the MEMS 251. On the gimbal 202, a plurality of connection pads 221a to 221h are disposed in a row along the left-right direction, which is nominally the radial direction of the magnetic-recording disk 101. The plurality of connection pads 221a to 221h are connected to transmission lines 222a to 222h on the gimbal 202, respectively. The transmission lines 222a to 222h transmit signals between a preamplifier IC and a head-slider 105, as well as between the preamplifier IC and a piezoelectric element 252. The connection pads 221a and 221h and the transmission lines 222a and 222h transmit signals for the piezoelectric element 252; and, the other connection pads and transmission lines transmit signals for the head-slider 105. The signals for the head-slider 105 include a read-back signal, a write signal, and a signal to a heater element for fly-height adjustment, by way of example without limitation thereto.

The MEMS 251 includes a plurality of connection pads 512a to 512h corresponding to the connection pads 221a to 221h on the gimbal 202, respectively. The plurality of connection pads 512a to 512h are disposed in a row along the left-right direction on the trailing-edge surface 513, which is one of the side surfaces of the MEMS 251. The connection pads 512a to 512h face the connection pads 221a to 221h on the gimbal 202, respectively.

In accordance with an embodiment of the present invention, the connection pads 221a to 221h are electrically and physically interconnected with the connection pads 512a to 512h, respectively, with metallic interconnection joints (not shown in FIG. 4) such as solder, or alternatively, gold. Molten metal, which may be solder, is hardened on the two connection pads to provide metal interconnecting and joining, or alternatively, welding, two respective connection pads of the connection pads 221a to 221h and the connection pads 512a to 512h, respectively.

The connection pads 512a to 512h are formed on the trailing-edge surface 513 and the top surface 514 of the MEMS 251, which are also the trailing-edge surface 513 and the top surface 514 of the silicon substrate of the MEMS 251. Respective portions of the connection pads 512a to 512h are formed on the trailing-edge surface 513 and the other portions are formed on the top surface 514. The connection pads 512a to 512h cover the edge between the trailing-edge surface 513 and the top surface 514.

The connection pads 512a to 512h are connected with the transmission lines 515a to 515h, respectively, on the top surface 514. The transmission lines 515a and 515h transmit signals to the piezoelectric element 252 and are connected with pads of the piezoelectric element 252. The transmission lines 515b to 515g are connected with the connection pads 516b to 516g, respectively. The connection pads 516b to 516g are interconnected with the connection pads of the head-slider 105 mounted on the top surface 514.

The connection pads of the head-slider 105 and the connection pads on the top surface of the MEMS 251 can be interconnected using the same method as the interconnection between the connection pads of the microactuator 205 and those of the suspension 110. In one embodiment of the present invention shown in FIG. 4, the connection pads 512a to 512h, the transmission lines 515a and 515h, and the connection pads 516b to 516g are formed simultaneously by the same process. Hence, the connection pads 512a to 512h, the transmission lines 515a and 515h, and the connection pads 516b to 516g are made of the same material, are formed together, and have the same thicknesses. As shown in FIG. 4, the trailing-edge surface 513 of the MEMS 251, which is between the undersurface, which is the surface facing the gimbal, and the top surface 514, which is the surface facing a the magnetic-recording disk 101, of the MEMS 251, is slanted in such a manner that the top surface side is slanted toward the leading-edge side.

Figure 5:
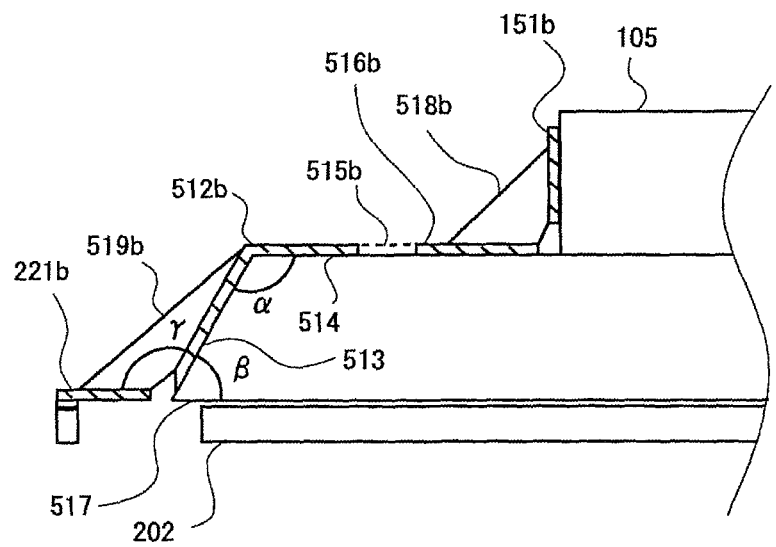
FIG. 5 is a cross-sectional view depicting a structure of the proximity of the trailing-edge surface of the MEMS, in accordance with an embodiment of the present invention.

With reference now to FIG. 5, in accordance with an embodiment of the present invention, a cross-sectional view is shown that schematically depicts the structure of the proximity of the trailing-edge surface 513 of the MEMS 251. FIG. 5 shows the connection pad 221b and 512b, the transmission line 515b, the connection pad 516b, and the connection pad 151b of the head-slider 105. The other connection pads of the gimbal 202 to be connected with the connection pads of the head-slider 105, the other connection pads on the MEMS 251, and the transmission lines for connecting the other connection pads on the MEMS 251 have the same structure.

As shown in FIG. 5, the angle β between the under surface 517 and the trailing-edge surface 513 of the MEMS is not perpendicular, but acute; and, the angle α between the trailing-edge surface 513 and the top surface 514 is not perpendicular, but obtuse. Since the trailing-edge surface 513 and the top surface 514 have such an angle α, the connection pad 512b formed over the edge therebetween has the same angle α. Namely, the angles between the side portions and the top portions of the connection pads 512a to 512h are not perpendicular, but an obtuse angle α, which is more than 90°.

In FIG. 5, a metallic interconnection joint 518b interconnects the connection pad 151b of the head-slider 105 and the connection pad 516b of the MEMS; and, a metallic interconnection joint 519b interconnects the connection pad 512b of the MEMS and the connection pad 221b of the gimbal. Since the angle α in each of the connection pads 512a to 512h of the MEMS is obtuse, the connection pads 512a to 512h have a given thickness which can be formed easily. Thus, in an embodiment of the present invention, the reliability of interconnection against an external impact, or temperature, change can be increased.

Specifically, the obtuse angle α provides a more uniform thickness for the bend portions of the connection pads 512a to 512h, reducing the possibility of breakage of the connection pads. For a MEMS having a silicon substrate, which has been described with reference to the drawings so far, the trailing-edge surface 513 and the connection pads 512a to 512h having the present structure are useful.

A MEMS equipped with a silicon substrate for a main plate is manufactured with a semiconductor manufacturing technology using a photolithography process. If the trailing-edge surface 513 is vertical, depositing a metal layer thereon by plating is difficult; so, PVD technology is used, such as sputtering, or alternatively, vacuum deposition. The metal layer to be deposited by PVD is thinner than the one deposited by plating, diminishing the reliability of an interconnection joint.

In the present structure, in accordance with embodiments of the present invention, a portion of a connection pad can be formed easily on the trailing-edge surface 513 by plating. Since plating can increase the thickness of the film, the reliability of the connection pad can be increased. Furthermore, the side portion and the top portion of the connection pad can be formed concurrently instead of separately, which increases the manufacturing efficiency, in addition to the reliability.

As shown in FIG. 5, if the side portions of the connection pads 512a to 512h are slanted, the respective confronting angles γ between the connection pads 512a to 512h and the corresponding connection pads 221a to 221h on the gimbal 202 are obtuse. If the confronting angle γ is too large, molten metal for the metallic interconnection joint is drawn to either connection pad, for example, by capillary action, so that connection failure at the metallic interconnection joint may be more likely to happen, resulting in reduction in manufacturing yield.

Figure 6:
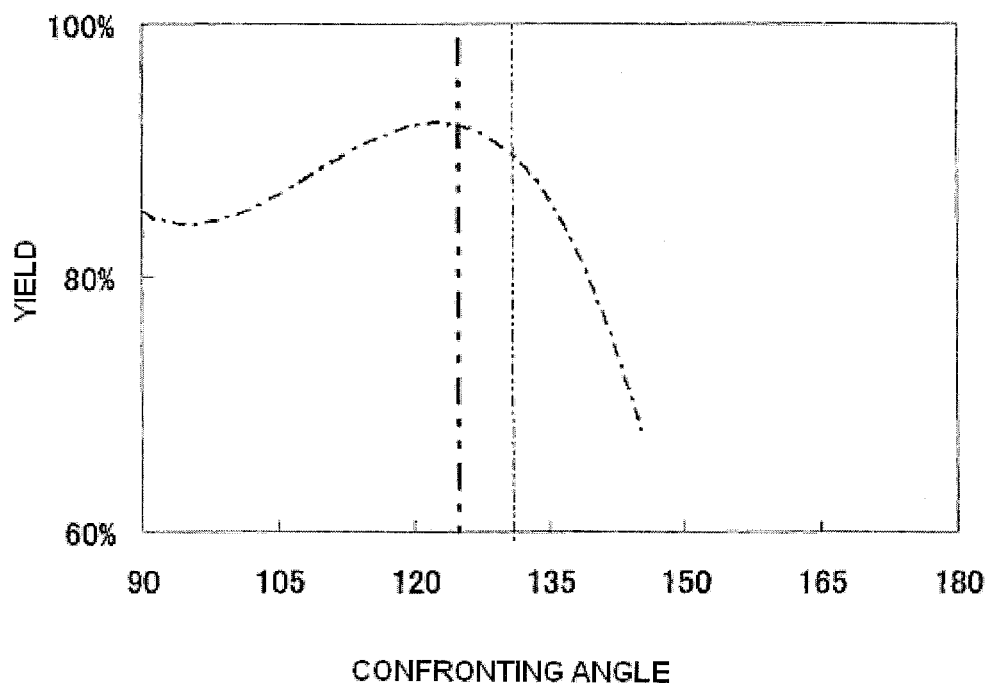
FIG. 6 is a graph of measurement results showing the graphical relationship between manufacturing yield and the confronting angle, between a connection pad of the MEMS and a connection pad of a gimbal, in accordance with an embodiment of the present invention.

With reference now to FIG. 6, in accordance with an embodiment of the present invention, a graph of measurement results is shown that shows the graphical relationship between the manufacturing yield and the confronting angle γ, between a connection pad of the MEMS 251 and a connection pad of the gimbal 202. As seen in FIG. 6, when the confronting angle γ between two pads is 125°, a high yield was attained.

Figure 7:
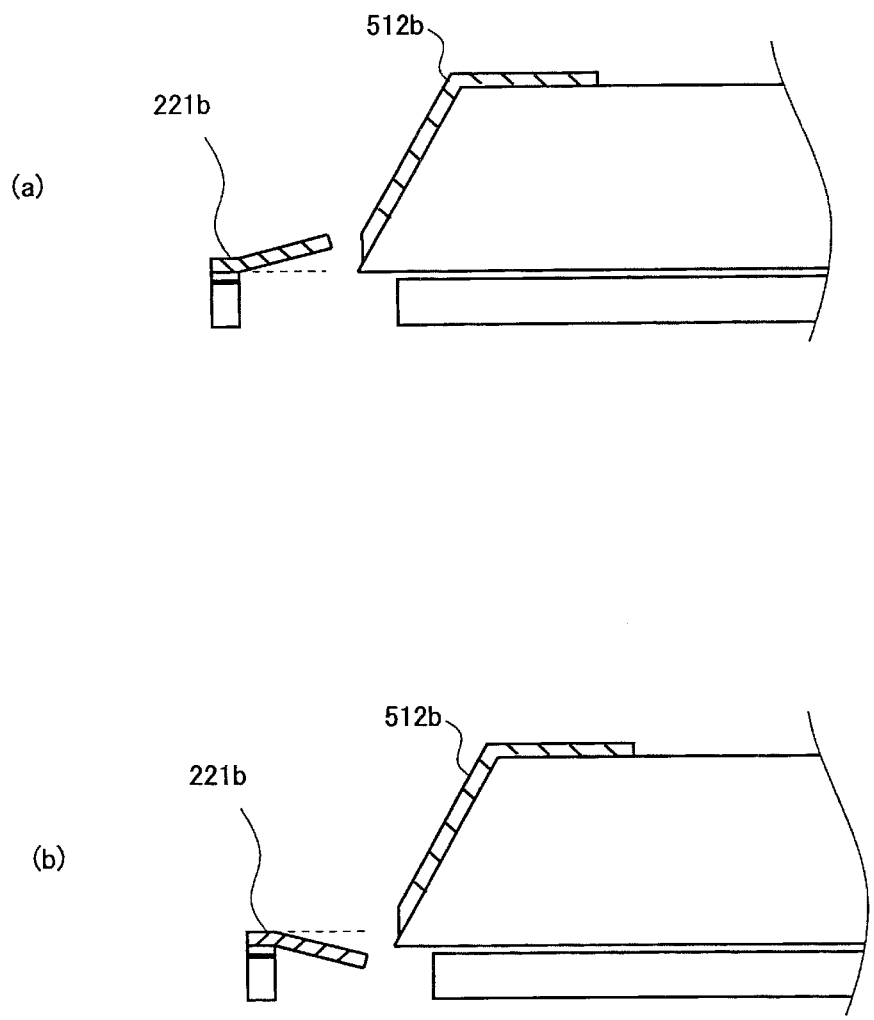
FIG. 7 are drawings schematically illustrating variations of the angle of the connection pad of a gimbal of a suspension that are within manufacturing tolerance, in accordance with an embodiment of the present invention.

In this regard, with reference now to FIGS. 7(a) and 7(b), in accordance with an embodiment of the present invention, the angle of a connection pad on the gimbal 202 to the main plate of the gimbal, which is parallel to the top surface 514 of the MEMS, varies in every suspension within a manufacturing tolerance. A tolerance of ±10 micrometers (μm) is assumed for the bend of the connection pad; and, the above-described measurement has been performed on HGAs manufactured within this tolerance. The range of the tolerance for the bend is equivalent to ±7° of the range of the tolerance of the confronting angle γ between the two connection pads. Hence, if the confronting angle γ between the two pads is no more than 132°, a high yield of the metallic interconnection joint can be attained more reliably.

In the above-described embodiment of the present invention, the structure of a connection pad for the microactuator is useful for a microactuator adopting a MEMS including a silicon substrate as a main portion. In accordance with embodiments of the present invention, a manufacturing method of a MEMS 251 is next described with reference to FIGS. 8(a)-8(e) and 9(a)-9(f).

Figure 8:
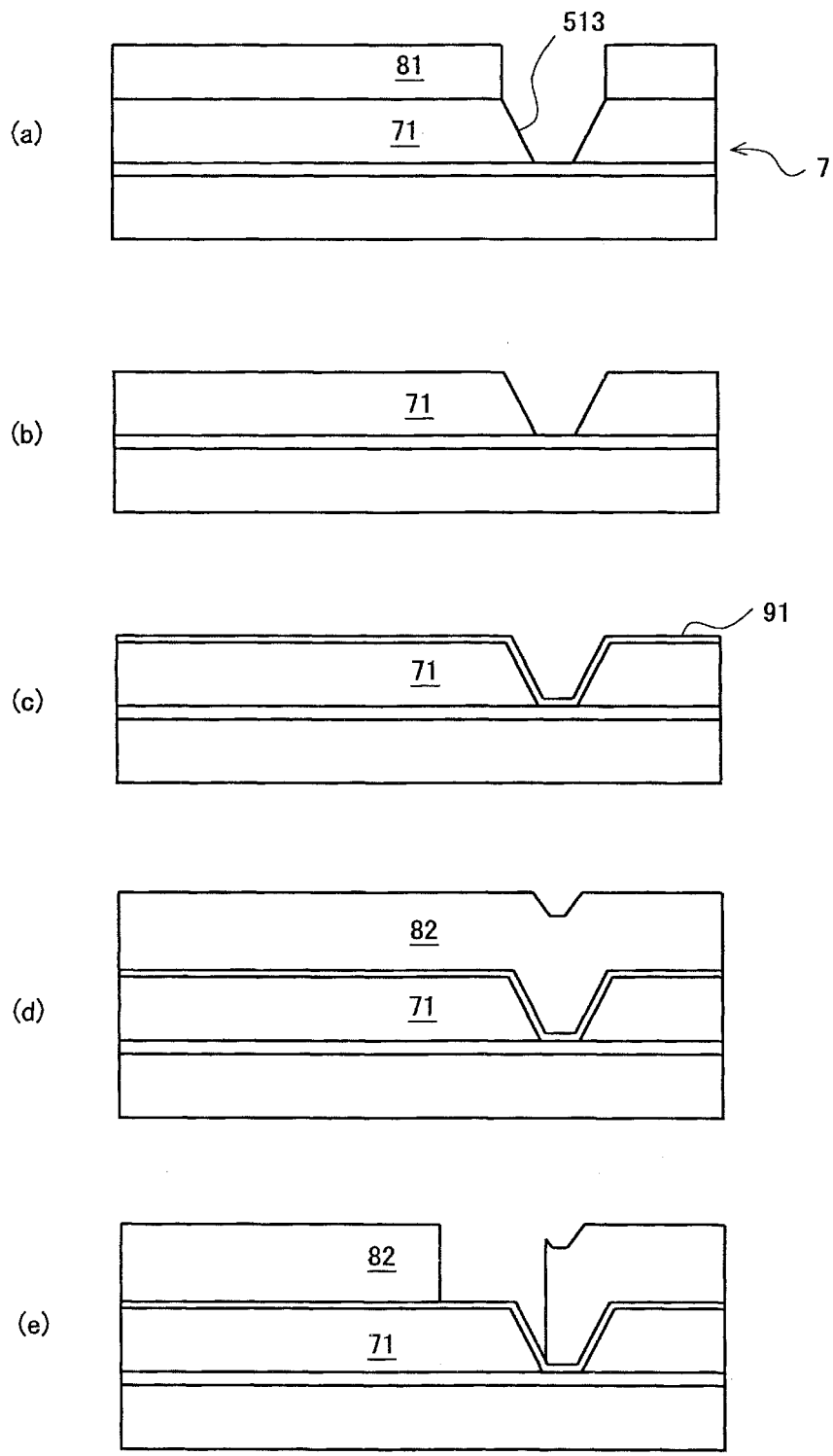
FIGS. 8(a)-8(e) are drawings schematically illustrating manufacturing operations in the manufacture of a MEMS, in accordance with an embodiment of the present invention.

With reference now to FIGS. 8(a)-8(e) and 9(a)-9(f), in accordance with an embodiment of the present invention, drawings are shown that illustrate chiefly the trailing-edge surface 513. The MEMS is manufactured by a semiconductor manufacturing process. First, as shown in FIG. 8(a), the method forms a pattern of photoresist 81 on a silicon-on-insulator (SOI) substrate 7, and etches a silicon layer 71 by anisotropic etching. The diameter of a hole formed in the silicon layer 71 becomes smaller toward the bottom because of the anisotropic etching. Thus, in an embodiment of the present invention, a trailing-edge surface 513 of a silicon substrate having a specific angle can be formed with accuracy. After removing the photoresist 81 (see FIG. 8(b)), as shown in FIG. 8(c), the method deposits a metal seed layer 91 for plating on the silicon layer 71 by sputtering. As shown in FIG. 8(d), the method deposits a photoresist 82 on the seed layer 91, and further, forms a pattern by exposure and development (see FIG. 8(e)).

Figure 9:
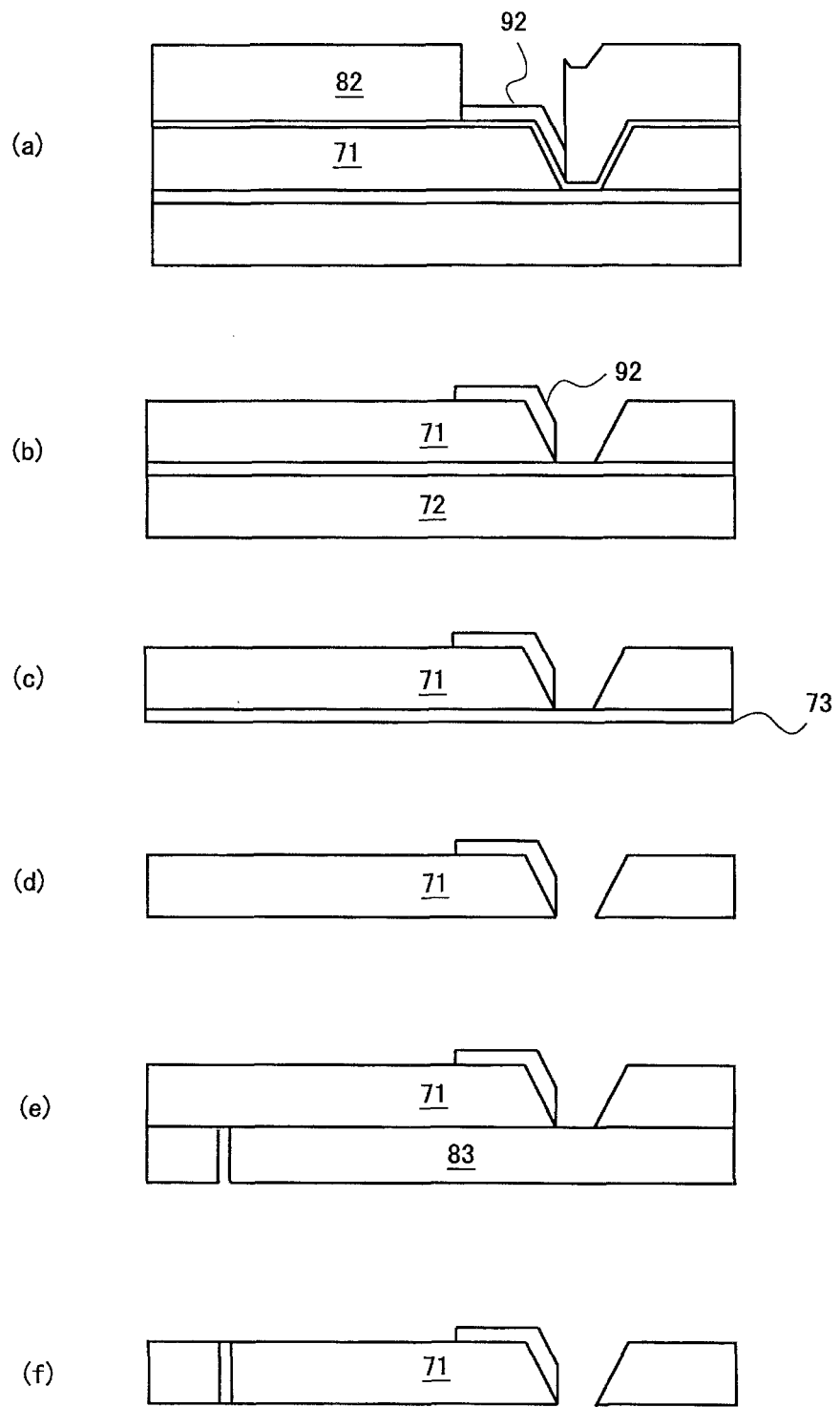
FIGS. 9(a)-9(f) are drawings schematically illustrating further manufacturing operations in the manufacture of a MEMS, in accordance with an embodiment of the present invention.

Next, as shown in FIG. 9(a), the method deposits a metal layer 92, by plating, on the seed layer 91 which has been exposed by patterning of the photoresist 82. In this operation, connection pads 512a to 512h having a specific angle for covering the side and top surfaces of the silicon substrate are formed. The connection pads 512a to 512h are formed in conformity with the shape of the surface of the silicon substrate. The method forms the side portions of the connection pads, which are the portions on the trailing-edge surface, by plating to increase the film thickness. Moreover, the method forms the side portions on the bend at an obtuse angle to make uniform the film thickness. In addition, the method forms the side portions and the top portions in a single plating process so that connection pads having a uniform film thickness can be formed efficiently.

After forming the metal layer 92, the method removes the photoresist 82 and the exposed unnecessary seed layer 91 as shown in FIG. 9(b). Furthermore, the method removes a back silicon layer 72 by grinding (see FIG. 9(c)), and removes the silicon oxide insulating layer 73 by etching (see FIG. 9(d)). The method forms a resist pattern 83 on the backside of the silicon layer 71 which has been exposed by removing the silicon oxide insulating layer 73 (see FIG. 9(e)), and forms a hole in the silicon layer 71 by etching to form a movable portion on the silicon layer 71.

The method affixes a piezoelectric element 252 to the formed MEMS 251 to form a microactuator 205. In manufacturing a HGA, the method secures the microactuator 205 to a suspension 110, and affixes a head-slider 105 to the microactuator 205. Then, the method interconnects connection pads between the microactuator 205 and the suspension 110, and interconnects connection pads between the microactuator 205 and the head-slider 105. Thus, in an embodiment of the present invention, a HGA 200 is manufactured. The order of securing the components and interconnecting the connection pads may be selected as appropriate for the manufacture, being within the spirit and scope of embodiments of the present invention.

An assembly of the actuator 106 and the head-slider 105 together with other components includes an arm 111 and the manufactured HGA secured to the arm 111. The manufacture of a HDD mounts components such as this assembly, a SPM 103, and a magnetic-recording disk 101 inside a base 102 and implements a control circuit board with control circuits for the HDD mounted thereon. Furthermore, through a servo write operation and a test operation, a HDD as a product is completed.

As set forth above, embodiments of the present invention have been described by way of examples; but, embodiments of the present invention are not limited to the above-described examples. A person skilled in the art may easily modify, add, or convert the components in the above-described examples within the spirit and scope of embodiments of the present invention. For example, embodiments of the present invention are useful for a HDD, but may also be applied to other types of disk drive. For example, in one embodiment of the present invention, the connection pad structure is suitable for a microactuator having a MEMS made of a silicon substrate; but, in another embodiment of the present invention, the connection pad structure may be applied to a microactuator having another structure. In one embodiment of the present invention, the side and the top portions of a connection pad over a obtuse bend portion are formed in a single plating process; but, in another embodiment of the present invention, the side and the top portions of a connection pad over a obtuse bend portion may be formed separately; or alternatively, a metal layer for the connection pad may be deposited on the bend portion by vapor deposition.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A head-gimbal assembly comprising:
    a suspension;
    a microactuator disposed on said suspension;
    a head-slider bonded to said microactuator;
    a connection pad disposed on said suspension;
    a connection pad disposed on said microactuator and formed over an edge between a non-vertical side surface with respect to a flat top surface of said microactuator to have a bend portion with an angle, said angle being an obtuse angle between said flat top surface and said non-vertical side surface; and
    a metallic interconnection joint for interconnecting said connection pad of said suspension with said connection pad of said microactuator.

2. The head-gimbal assembly of claim 1, wherein an angle between said connection pad of said suspension and a side portion of said connection pad of said microactuator is an obtuse angle of no more than 132°.

3. The head-gimbal assembly of claim 1, wherein the microactuator comprises:
    a silicon substrate comprising a movable portion, and a stationary portion; and
    a piezoelectric element affixed on said silicon substrate;
    wherein an angle of a bend portion formed by said side surface and said top surface of said microactuator is obtuse; and, the connection pad of said microactuator is formed in conformity with a shape of said bend portion of said microactuator.

4. The head-gimbal assembly of claim 1, wherein the connection pad of said microactuator has a same thickness in a side portion and a top portion thereof.

* * * * *